US012659807B2

(12) United States Patent
Sekhar U

(10) Patent No.: US 12,659,807 B2
(45) Date of Patent: Jun. 16, 2026

(54) APPARATUS, SYSTEM, AND METHOD OF CONFIGURING A BLUETOOTH LINK FOR COMMUNICATION WITH A HUMAN INTERFACE DEVICE (HID)

(71) Applicant: INTEL CORPORATION, Santa Clara, CA (US)

(72) Inventor: Chandra Sekhar U, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 802 days.

(21) Appl. No.: 18/072,429

(22) Filed: Nov. 30, 2022

(65) Prior Publication Data

US 2024/0179575 A1    May 30, 2024

(51) Int. Cl.
*H04W 28/20*      (2009.01)
*H04W 4/80*       (2018.01)
*H04W 76/14*      (2018.01)

(52) U.S. Cl.
CPC ............. *H04W 28/20* (2013.01); *H04W 4/80* (2018.02); *H04W 76/14* (2018.02)

(58) Field of Classification Search
CPC ....... H04W 28/20; H04W 4/80; H04W 76/14; H04W 84/18; G06F 3/0231; H04M 1/72412

USPC ......................................................... 455/41.2
See application file for complete search history.

(56) References Cited

U.S. PATENT DOCUMENTS

2009/0160731 A1* 6/2009 Schuler ................. G06F 3/1423
                                                    345/1.1
2012/0179037 A1* 7/2012 Halmann ............... A61B 8/585
                                                    600/443

OTHER PUBLICATIONS

Bluetooth Core Specification Version 5.3, Jul. 13, 2021, 3085 pages.

* cited by examiner

*Primary Examiner* — Eugene Yun
(74) *Attorney, Agent, or Firm* — Shichrur & Co.

(57) ABSTRACT

For example, a Bluetooth (BT) device may be capable of configuring a BT link for communication between the BT device and a keyboard device. For example, the BT device may be configured to identify a keypress attribute of keypresses on the keyboard device. For example, the BT device may be configured to identify the keypress attribute based on transmissions from the keyboard device to the BT device over the BT link between the BT device and the keyboard device. For example, the BT device may configure a bandwidth (BW) allocation for the BT link, for example, based on the keypress attribute.

25 Claims, 4 Drawing Sheets

302

Identify, at a Bluetooth (BT) device, a keypress attribute of keypresses on a keyboard device based on transmissions from the keyboard device to the BT device over a BT link between the BT device and the keyboard device

304

Configure a bandwidth (BW) allocation for the BT link based on the keypress attribute

APPARATUS, SYSTEM, AND METHOD OF CONFIGURING A BLUETOOTH LINK FOR COMMUNICATION WITH A HUMAN INTERFACE DEVICE (HID)

TECHNICAL FIELD

Aspects described herein generally relate to configuring a Bluetooth link for communication with a Human Interface Device (HID).

BACKGROUND

A first Bluetooth device may be connected to and/or paired with a second Bluetooth device, for example, to transfer data between the first and second Bluetooth devices.

When setting up a Bluetooth link between two Bluetooth devices, there may be a need to configure one or more attributes for communication over the Bluetooth link.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
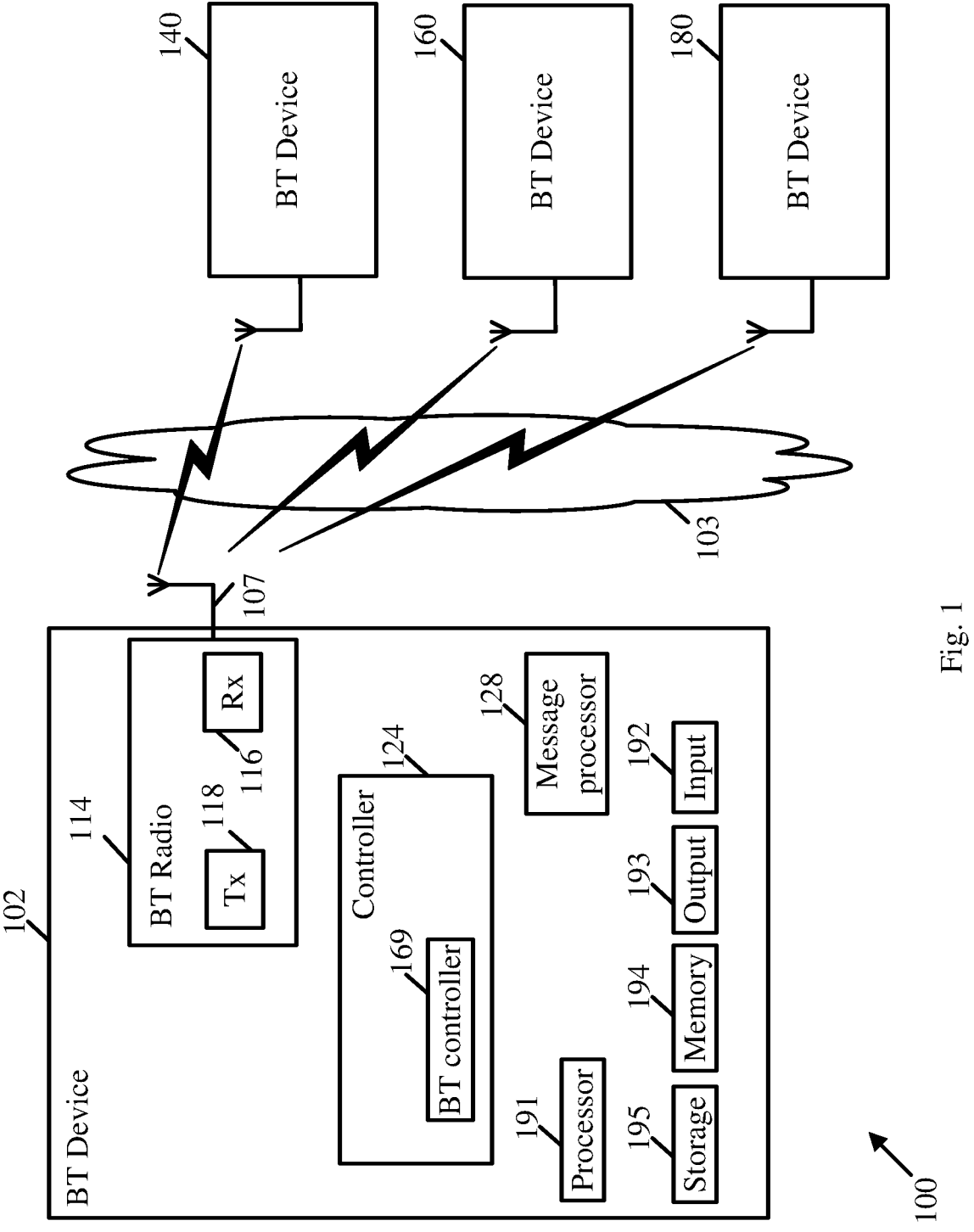
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Bluetooth (BT) device, a Bluetooth Low Energy (BLE) device, an audio device, a video device, an audio (A/V) device, a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IOT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing Bluetooth standards ("the Bluetooth standards"), e.g., including *Bluetooth Core Specification V* 5.3, Jul. 13, 2021, and/or future versions and/or derivatives thereof, devices and/or networks operating in accordance with existing IEEE 802.11 standards (including IEEE 802.11-2020 (*IEEE 802.11-2020, IEEE Standard for Information Technology-Telecommunications and Information Exchange between Systems Local and Metropolitan Area Networks-Specific Requirements; Part 11: Wireless LAN Medium Access Control (MAC) and Physical Layer (PHY) Specifications*, December, 2020)) and/or future versions and/or derivatives thereof, devices and/or networks operating in accordance with existing cellular specifications and/or protocols, units and/or devices which are part of the above networks, and the like.

Some aspects may be used in conjunction with one way and/or two-way radio communication systems, a Bluetooth system, a BLE system, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band of 2.4 GHz, 5 GHZ, or 6 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects are described herein with respect to BT communication, e.g., according to a BT protocol and/or a BLE protocol. However, other aspects may be implemented with respect to any other communication scheme, network, standard and/or protocol.

Reference is now made to FIG. 1, which schematically illustrates a block diagram of a system 100, in accordance with some demonstrative aspects.

As shown in FIG. 1, in some demonstrative aspects system 100 may include a wireless communication network including one or more wireless communication devices, e.g., including wireless communication devices 102, 140, 160 and/or 180.

In some demonstrative aspects, devices 102, 140, 160 and/or 180 may include, operate as, and/or perform the functionality of one or more BT devices.

In some demonstrative aspects, devices 102, 140, 160 and/or 180 may include a BT mobile device. In other aspects, devices 102, 140, 160 and/or 180 may include a non-mobile BT device.

In one example, devices 102, 140, 160 and/or 180 may include BT Low Energy (LE) (BLE) compatible devices. In other aspects, devices 102, 140, 160 and/or 180 may include or implement any other additional or alternative BT communication functionality, e.g., according to any other additional or alternative BT protocol.

In some demonstrative aspects, device 102 may include, for example, a UE, an MD, a STA, a PC, a desktop computer, a mobile computer, a laptop computer, a Smartphone, a mobile phone, a cellular telephone, an Ultrabook™ computer, a notebook computer, a tablet computer, a server computer, a handheld computer, a handheld device, a wearable device, an on-board device, an off-board device, a hybrid device, a consumer device, a vehicular device, a non-vehicular device, a mobile or portable device, a non-mobile or non-portable device, a video device, an audio device, an A/V device, a media player, a television, a music player, or the like.

In some demonstrative aspects, devices 140 and/or 160 may include, for example, a Human Interface Device (HID).

In some demonstrative aspects, the HID may be configured to communicate according to an HID protocol.

In some demonstrative aspects, the HID protocol may include a legacy HID protocol, e.g., in accordance with a legacy BT protocol.

In some demonstrative aspects, the HID protocol may include a BLE HID protocol, e.g., in accordance with a BLE protocol. In one example, the HID protocol may include an HID over Generic Attribute (GATT) Protocol (HOGP), for example, implemented in accordance with the BLE protocol.

In other aspects, the HID may be configured to communicate according to any other additional or alternative HID and/or BT protocol.

In some demonstrative aspects, device 140 may include an HID of a first HID type, and/or device 160 may include an HID of a second type, e.g., different from the first HID type.

In one example, device 140 may include a keyboard device, and/or device 160 may include a mouse device.

In some demonstrative aspects, device 140 and device 160 may include HID devices of a same HID type. For example, device 140 may include a first keyboard device, and/or device 160 may include a second keyboard device.

In other aspects, device 140 and/or device 160 may include any other suitable type of HID apparatus, device, module and/or unit.

In some demonstrative aspects, device 180 may include, operate as, and/or perform the functionality of another BT device.

For example, device 180 may include, operate as, and/or perform the functionality of a BT audio device. For example, the BT audio device may include a BT headset, a BT headphone, a BT earphone, a BT hands-free device, a voice-controlled device, a smart speaker device, a sensor device, a BT A/V device, a device incorporating a BT audio device, and/or any other audio device, which may be configured to communicate audio traffic with BT device 102.

In some demonstrative aspects, devices 102, 140, 160 and/or 180 may include, operate as, and/or perform the functionality of one or more STAs. For example, device 102 may include at least one STA, and/or device 140 may include at least one STA.

In some demonstrative aspects, devices 102, 140, 160 and/or 180 may include, operate as, and/or perform the functionality of one or more WLAN STAs.

In some demonstrative aspects, devices 102, 140, 160 and/or 180 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In other aspects, devices 102, 140, 160 and/or 180 may include, operate as, and/or perform the functionality of any other type of STA and/or device.

In some demonstrative aspects, device 102 may include, for example, one or more of a processor 191, an input unit 192, an output unit 193, a memory unit 194, and/or a storage unit 195. Device 102 may optionally include other suitable hardware components and/or software components. In some demonstrative aspects, some or all of the components of device 102 may be enclosed in a common housing or packaging, and may be interconnected or operably associated using one or more wired or wireless links. In other aspects, components of device 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative aspects, input unit 192 may include, for example, a keyboard, a keypad, a mouse, a touch-screen, a touch-pad, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, or other suitable removable or non-removable storage units. Memory unit 194 and/or storage unit 195, for example, may store data processed by device 102.

In some demonstrative aspects, wireless communication devices 102, 140, 160 and/or 180 may be capable of communicating content, data, information and/or signals via a wireless medium (WM) 103.

In some demonstrative aspects, wireless medium 103 may include, for example, a BT channel, a radio channel, a cellular channel, a Global Navigation Satellite System (GNSS) Channel, an RF channel, a WiFi channel, an IR channel, and the like.

In some demonstrative aspects, wireless communication medium 103 may include a 2.4 GHz frequency band, and/or one or more other wireless communication frequency bands, for example, a 5 GHz frequency band, a 6 GHz frequency band, a millimeterWave (mmWave) frequency band, e.g., a 60 GHz frequency band, a Sub-1 GHz (S1G) band, and/or any other frequency band.

In some demonstrative aspects, devices 102, 140, 160 and/or 180 may include one or more BT radios including circuitry and/or logic to perform wireless communication between devices 102, 140, 160, 180 and/or one or more other BT devices. For example, device 102 may include at least one BT radio 114.

In some demonstrative aspects, devices 102, 140, 160 and/or 180 may include one or more other radios, e.g., a WiFi radio, an OFDM radio, a cellular radio, and/or the like.

In some demonstrative aspects, BT radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative aspects, BT radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative aspects, BT radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, BT radio 114 may be configured to communicate over a 2.4 GHz band, and/or any other band.

In some demonstrative aspects, BT radio 114 may include, or may be associated with, one or more antennas. For example, BT radio 114 may include, or may be associated with, one or more antennas 107.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. In some aspects, antennas 107 may implement transmit and receive functionalities using separate transmit and receive antenna elements. In some aspects, antennas 107 may implement transmit and receive functionalities using common and/or integrated transmit/receive elements.

In some demonstrative aspects, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180 and/or one or more other devices, e.g., as described below.

In some demonstrative aspects, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a BT device, e.g., device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, controller 124 may be configured to include and/or perform one or more functionalities and/or operations of a BT controller 169 of the BT device 102.

In some demonstrative aspects, one or more functionalities and/or operations of controller 124 may be implemented as part of a host processor of the BT device 102.

In other aspects, controller 124 may be implemented by one or more additional or alternative elements of device 102.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, message processor 128 may include circuitry and/or logic, e.g., processor circuitry and/or logic, memory circuitry and/or logic, MAC circuitry and/or logic, PHY circuitry and/or logic, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative aspects, at least part of the functionality of message processor 128 may be implemented as part of controller 124.

In other aspects, the functionality of message processor 128 may be implemented as part of any other element of device 102.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of BT radio 114. For example, the chip or SoC may include one or more elements of controller 124, one or more elements of message processor 128, and/or one or more elements of BT radio 114. In one example, controller 124, message processor 128, and BT radio 114 may be implemented as part of the chip or SoC.

In other aspects, controller 124, message processor 128 and/or BT radio 114 may be implemented by one or more additional or alternative elements of device 102.

In some demonstrative aspects, for example, in some use cases, scenarios, deployments, and/or implementations, there may be a need to provide a technical solution to support improved, e.g., optimal, multipoint bandwidth allocation for BT communication to be performed by device 102 with a plurality BT devices, e.g., including BT devices 140, 160 and/or 180, e.g., as described below.

In some demonstrative aspects, controller 124 may be configured to perform the multipoint bandwidth allocation, for example, to allocate BT communication resources for communication between BT device 102 and a plurality of BT devices, e.g., devices 140, 160, and/or 180.

In some demonstrative aspects, controller 124 may be configured to perform the multipoint bandwidth allocation according to a multipoint bandwidth allocation mechanism, which may be configured to support bandwidth allocation to a plurality of different types of HID devices, which may have different requirements for bandwidth allocation, e.g., as described below.

For example, a keyboard device may have one or more first communication requirements, which may define one or more first bandwidth allocation requirements.

For example, a mouse device may have one or more second communication requirements, e.g., which may be different from the communication requirements of the keyboard device, and may define one or more second bandwidth allocation requirements e.g., which may be different from the bandwidth allocation requirements of the keyboard device.

For example, different HID devices, e.g., BT device 140 and BT device 160, may have different actual HID quality of service (QOS) requirements.

In some demonstrative aspects, a BT link may be utilized for communication between a host device and a keyboard device. For example, device 102 may perform one or more operations of, functionalities of, and/or a role of, the host device; and/or device 140 may perform one or more operations of, functionalities of, and/or a role of, the keyboard device.

In some demonstrative aspects, the BT link may include a "legacy" BT link, e.g., according to a legacy BT protocol.

In some demonstrative aspects, the BT link may include a BLE (BTLE) link, e.g., a BT smart link, configured according to a BLE protocol.

In other aspects, any other type of BT link and/or BT protocol may be used.

In some demonstrative aspects, the BT link may be configured to support an LE, e.g., BLE, keyboard connection. For example, the BT link may be configured according to a BT link topology in which a controller of the host device may perform a role of a master device of the BT link, and a controller of the keyboard device may perform a role of a slave device of the BT link.

In other aspects, any other BT link configuration and/or topology may be implemented.

For example, some keyboard devices, e.g., LE HID keyboard devices, may be configured to request for relatively short connection intervals and/or low slave latency, e.g., similar to settings utilized for some mouse devices.

In one example, some keyboard devices may be configured to utilize BT connection parameters, e.g., BLE connection parameters, including a connection interval of 22.5 milliseconds (ms), a slave latency of 9, and/or any other connection interval and/or slave latency.

For example, the connection interval may include a BLE connection interval. For example, the BLE connection interval may include a time between two data transfer events, e.g., BLE connection events, between a central BT device and a peripheral BT device.

In some demonstrative aspects, for example, in some implementations, use cases, deployments, and/or scenarios, it may be disadvantageous to utilize default link settings for the BT link.

For example, utilizing default link settings, e.g., a connection interval of 22.5 ms and/or a slave latency of 9, may lead to non-optimal use of bandwidth, e.g., which may result in wasted bandwidth.

For example, in many use cases, keyboard devices may rarely consume the full bandwidth (BW) and/or latency, which may be defined according to default settings. For example, in some keyboard use cases, e.g., some typical keyboard use cases, a keyboard device may utilize a relatively small portion, e.g., less than 5%, of the requested, e.g., default, bandwidth.

In some demonstrative aspects, controller 124 may be configured to implement a scheduling mechanism (also referred to as "scheduling on demand" mechanism), which may be configured to control and/or configure a bandwidth allocation of a BT link between device 102 and a keyboard device, e.g., keyboard device 140, e.g., as described below.

In some demonstrative aspects, device 102 may include a host device, e.g., a laptop or any other host device, which may be configured to detect a keyboard use case corresponding to the keyboard device, for example, a keyboard use case of keyboard device 140, e.g., as described below.

In some demonstrative aspects, the host device, e.g., device 102, may implement the scheduling on demand mechanism to schedule a BW for the BT link between the host device and the keyboard device, for example, based on the keyboard use case, e.g., as described below.

In some demonstrative aspects, the scheduling on demand mechanism may be configured to provide a technical solution to support freeing up an unused bandwidth of the BT link between the host device and the keyboard device, e.g., as described below.

For example, the unused bandwidth of the BT link between the host device and the keyboard device may be freed up for communication between the host device and another HID device, e.g., a mouse, and/or another BT device, e.g., a headset.

In some demonstrative aspects, the scheduling on demand mechanism may be utilized to provide a technical solution to support reassigning the unused bandwidth as available bandwidth for other links. This technical solution may assist in better multi device user experience, for example, even without impacting a keyboard-latency of the keyboard device, e.g., as seen by the user.

In some demonstrative aspects, for example, in some implementations, scenarios, use cases, and/or deployments, an implementation of a slave latency feature, e.g., in accordance with a BT protocol Specification, may not be sufficient to support efficient BW allocation for a BT link between a host device and a keyboard device. For example, the slave latency feature may allow a slave device to listen on a reduced number of connection anchor points. Accordingly, the slave latency feature may allow the slave device to become active on the BT link, for example, only when the slave device has HID reports for transmission and/or based on any other additional or alternative reasons. However, the slave latency feature is targeted at the slave device, which may typically be a small form factor device, while the master device may still be expected to schedule on all the anchor points. Accordingly, the slave latency feature may not be suitable for providing a technical solution for BW allocation by the master device.

In some demonstrative aspects, for example, in some implementations, scenarios, use cases, and/or deployments, implementation of a connection update procedure, e.g., in accordance with a BT protocol Specification, may not be sufficient to support efficient BW allocation for a BT link between a host device and a keyboard device.

For example, the connection update procedure may be implemented to provide a technical solution to support the master device, e.g., a laptop, and/or the slave device, e.g., a keyboard, to detect a keyboard use case, and to update the connection parameters to desired values, e.g., via a link layer transaction. For example, connection parameters may be updated to tolerate a larger latency, which may still be sufficient to support the BT link for the keyboard use case. Accordingly, the connection update procedure may be implemented to provide a technical solution to resolve the issue of mandating the master device to honor all the connection anchor points. However, the connection update procedure may be configured to provide the controller with a limited set of connection intervals, e.g., only two sets of connection intervals, to choose from. Therefore, the connection update procedure may not provide a sufficient solution for supporting BW allocation and/or addressing the issue of wasted bandwidth in many cases, for example, for multiple use cases of a keyboard device. In addition, many keyboard devices may not support this feature, e.g., as the connection update procedure may be optional, and/or or since the as the connection update procedure may be more suitable to improve the master's performance.

In some demonstrative aspects, for example, in some implementations, scenarios, use cases, and/or deployments, implementation of a connection sub-rating feature, e.g., in accordance with a BT protocol Specification, may not be sufficient to support efficient BW allocation for a BT link between a host device and a keyboard device.

For example, the connection sub-rating feature may be configured to allow the master and slave devices to negotiate a connection interval setting, which is a multiple of connection intervals, e.g., five times a connection interval. For example, the connection sub-rating feature may be configured to allow the master and slave devices to switch between a particular connection interval, e.g., a 1× connection interval, and a multiple of the particular connection interval, e.g., 5× connection interval, for example, automatically, e.g., without further exchange of link layer's control packets, and/or dynamically, e.g., depending on data traffic on the link.

However, the connection sub-rating feature may not provide a suitable solution for keyboard devices. For example, keyboard devices may typically be small form factor devices, e.g., with smaller chip size and battery power, while the connection sub-rating feature may involve complex algorithm implementation, which may be adaptive and feedback based.

For example, the connection parameter update procedure may have a relatively large latency, e.g., as the updated parameters are to be negotiated via link layer's control packets, and the updated parameters are to be applied at a pre-determined future point of time. For example, this transaction may fail in a first attempt, e.g., due to unrelated reasons such as collision with a different transaction collision, as a channel map update may already be in progress, and the keyboard, which may be the initiator of the transaction, may be expected to retry. As a result, the keyboard device may be required to implement a queuing mechanism for transactions. This may also require the host's intervention, and the controller may be dependent on the host to allow for the updated parameters. However, the host may not have access to the data that the controller and keyboard have, e.g., information on the use case, and accordingly, the host may see the transaction fail as a "latency violation of the keyboard", and may thus erroneously interpret that these updated parameters may result in bad user experience.

In some demonstrative aspects, BT device 102 may be configured to implement a BW allocation mechanism to support BW allocation for a BT link between device 102 and a slave device, for example, BT device 140, e.g., as described below.

In some demonstrative aspects, the BW allocation mechanism may include a keyboard-based BW allocation mechanism, e.g., as described below.

In some demonstrative aspects, the BW allocation mechanism may include detecting, e.g., dynamically detecting, a type and use case of the slave device, e.g., as described below.

In some demonstrative aspects, the BW allocation mechanism may include determining a BW allocation for the BT link with the slave device, for example, based on the detected type and use case of the slave device, e.g., as described below.

In some demonstrative aspects, the BW allocation mechanism may include adjusting and/or updating, e.g., dynamically adjusting and/or updating, the BW allocation for the BT link with the slave device, for example, based on the detected type and use case of the slave device, e.g., as described below.

In some demonstrative aspects, BT device 102 may be configured to detect, that BT device 140 is a keyboard device, and to detect, e.g., dynamically detect, a keyboard use case of the keyboard device, e.g., as described below.

In some demonstrative aspects, BT device 102 may be configured to set, determine and/or adjust a BW allocation for the BT device 140, for examples based on the keyboard use case of the keyboard device, e.g., as described below.

In some demonstrative aspects, a keyboard use case of the keyboard device may be classified, e.g., broadly classified, for example, according to a plurality of predefined use cases, e.g., as described below.

In some demonstrative aspects, the keyboard use case of the keyboard device may be classified as a data entry use case ("standard use case of data entry"), e.g., as described below.

In some demonstrative aspects, the data entry use case may be classified as one of a plurality of predefined data entry use cases, for example, based on a user typing proficiency, e.g., as described below.

In some demonstrative aspects, at least three data entry use cases may be defined, for example, based on three types of user typing proficiencies, e.g., as described below.

For example, a first data entry use case may include a professional user use case, a second data entry use case may include a normal user use case, and/or a third data entry use case may include a novice user use case, e.g., as described below.

In other aspects, any other count and/or types of data entry use cases may be implemented.

In some demonstrative aspects, the keyboard use case of the keyboard device may be classified as a non-data entry use case ("special use case"), e.g., as described below.

In some demonstrative aspects, the non-data entry use case may be classified as one of a plurality of predefined special use cases, e.g., as described below.

In some demonstrative aspects, the special use case may include a gaming use case, e.g., as described below.

In some demonstrative aspects, the special use case may include a content consumption use case, for example, Internet browsing, reading content, e.g., news and/or emails, or the like, e.g., as described below.

In some demonstrative aspects, the special use case may include an online meeting use case, e.g., as described below.

In some demonstrative aspects, the special use case may include a presentation use case, e.g., as described below.

In some demonstrative aspects, the special use case may include a control mode use case, e.g., as described below.

In other aspects, any other additional or alternative use cases may be defined and/or implemented.

In some demonstrative aspects, BT device 102 may be configured to identify the keyboard use case of the keyboard device, e.g., of BT device 140, for example, by identifying a "fitting" to one of the plurality of predefined keyboard use cases, e.g., as described below.

In some demonstrative aspects, BT device 102 may be configured to set and/or adjust a bandwidth allocation of the BT link for the keyboard device, e.g., of BT device 140, for example, based on the identified keyboard use case, e.g., as described below.

In some demonstrative aspects, BT device 102 may utilize the BW allocation mechanism to provide a technical solution to support freeing up an allocated bandwidth, e.g., as much as up to about 90% of the bandwidth, which may be allocated for an HID keyboard link, for example, even without substantially impacting the latency, e.g., as described below.

In some demonstrative aspects, the BW allocation mechanism may be configured to provide a technical solution to support an improved multi=device user experience, e.g., as described below.

In some demonstrative aspects, the BW allocation mechanism may be configured to provide a technical solution to support a controller of the BT link, e.g., BT device 102, to re-allocate an unused bandwidth of the BT link to one or more other BT links, e.g., BT audio links, BT scans, or the like. For example, BT device 102 may utilize the BW allocation mechanism to free-up unused bandwidth of the BT link with the keyboard device, e.g., BT device 140. This freed-up bandwidth may be allocated to BT links of one or more other BT devices, e.g., BT device 160 and/or BT device 180. In one example, the controller of the BT link, e.g., BT device 102, may re-allocate an unused bandwidth of the BT link with the keyboard device to an audio link with a BT audio device, for example, ensure that a bandwidth allocated to the audio link supports a good audio experience, for example, while maintaining low latency over the BT link of the keyboard device.

In another example, the controller of the BT link, e.g., BT device 102, may re-allocate an unused bandwidth of the BT link with the keyboard device to one or more BT scans, for example, to assist in quicker and/or more efficient detection of advertisement beacons, e.g., beacons used by BT-based tags, and/or any other additional or alternative BT devices.

In some demonstrative aspects, the BW allocation mechanism may be configured to provide a technical solution to support improved WLAN coexistence, e.g., with WiFi networks.

For example, the BW allocation mechanism may be configured to provide a technical solution to support "smart" scheduling on the BT link with the keyboard device, which may support, for example, freeing up some unnecessary RF time on Bluetooth, which may be used for WiFi communications.

In some demonstrative aspects, the BW allocation mechanism may be configured to provide a technical solution to support improved power saving at the controller of the BT link, e.g., at BT device 102.

For example, the BW allocation mechanism may be configured to provide a technical solution to adjust a polling interval of the BT link with the keyboard device, for example, based on keyboard use case and/or a typing speed of the user of the keyboard device, e.g., as described below.

In one example, in case the user of the keyboard device is typing at a speed of 2 characters per second, the polling interval may be adjusted according to this typing speed, e.g., to approximately 500 ms. For example, this adjusted polling interval may allow the controller of the BT link, e.g., BT device 102, to service the BT link with the keyboard device, e.g., BT device 140, less frequently than negotiated. Accordingly, the controller of the BT link, e.g., BT device 102, may be allowed to enter a low power mode for longer periods of time.

In some demonstrative aspects, controller 124 and/or BT controller 169 may be configured to cause, trigger, instruct and/or control BT device 102 to identify a keypress attribute of keypresses on a keyboard device, e.g., a keyboard device implemented by BT device 140, for example, based on transmissions from the keyboard device to BT device 102 over a BT link between BT device 102 and the keyboard device, e.g., as described below.

In some demonstrative aspects, controller 124 and/or BT controller 169 may be configured to cause, trigger, instruct and/or control BT device 102 to configure a BW allocation for the BT link, for example, based on the keypress attribute, e.g., as described below.

In some demonstrative aspects, the BW allocation for the BT link may include a setting of a sequence of connection intervals scheduled for the keyboard device over the BT link, e.g., as described below.

In some demonstrative aspects, a time difference between consecutive connection intervals in the sequence of connection intervals scheduled for the keyboard device may be based on the keypress attribute, e.g., as described below.

In some demonstrative aspects, the time difference between two consecutive connection intervals in the sequence of connection intervals for the keyboard device may be at least 75 msec. In other aspects, the time difference between two consecutive connection intervals in the sequence of connection intervals for the keyboard device may have any other duration.

In some demonstrative aspects, the BW allocation for the BT link may include a setting of a sequence of pairs of connection intervals scheduled for the keyboard device over the BT link, e.g., as described below.

In some demonstrative aspects, a pair of connection intervals may include a first connection interval scheduled for a keypress report followed by a second connection interval scheduled for a key release report, e.g., as described below.

In some demonstrative aspects, a time difference between two consecutive pairs of connection intervals may be based on the keypress attribute, e.g., as described below.

In some demonstrative aspects, the BW allocation for the BT link may include a setting of a polling rate, e.g., as described below.

In other aspects, the BW allocation for the BT link may include a setting of any other additional or alternative parameters for the BT link.

In some demonstrative aspects, controller 124 and/or BT controller 169 may be configured to cause, trigger, instruct and/or control BT device 102 to identify the keypress attribute, for example, based on a pattern of the transmissions from the keyboard device to BT device 102 over the BT link, e.g., as described below.

In some demonstrative aspects, controller 124 and/or BT controller 169 may be configured to cause, trigger, instruct and/or control BT device 102 to identify the keypress attribute, for example, based on a rate of the transmissions from the keyboard device to BT device 102 over the BT link, e.g., as described below.

In some demonstrative aspects, controller 124 and/or BT controller 169 may be configured to cause, trigger, instruct and/or control BT device 102 to identify the keypress attribute, for example, based on a content of a keyboard input represented by the transmissions from the keyboard device, e.g., as described below.

In some demonstrative aspects, the transmissions from the keyboard device to BT device 102 over the BT link may include HID reports from the keyboard device, e.g., as described below.

In some demonstrative aspects, controller 124 and/or BT controller 169 may be configured to cause, trigger, instruct and/or control BT device 102 to identify the keypress attribute, for example, based on the HID reports, e.g., as described below.

In some demonstrative aspects, controller 124 and/or BT controller 169 may be configured to cause, trigger, instruct and/or control BT device 102 to identify the keypress attribute, for example, based on a time difference between two consecutive keypress HID reports, e.g., as described below.

In some demonstrative aspects, controller 124 and/or BT controller 169 may be configured to cause, trigger, instruct and/or control BT device 102 to identify the keypress attribute, for example, based on a time difference between a keypress HID report and a key release HID report subsequent to the keypress HID report, e.g., as described below.

In other aspects, any other additional or alternative criteria may be utilized to determine the identify the keypress attribute based on the HID reports.

In some demonstrative aspects, the keypress attribute may include a keypress rate corresponding to a rate of the keypresses on the keyboard device, e.g., as described below.

In some demonstrative aspects, controller 124 and/or BT controller 169 may be configured to cause, trigger, instruct and/or control BT device 102 to identify a keyboard use case, for example, based on the transmissions from the keyboard device to BT device 102 over the BT link, e.g., as described below.

In some demonstrative aspects, controller 124 and/or BT controller 169 may be configured to cause, trigger, instruct and/or control BT device 102 to configure the BW allocation for the BT link between BT device 102 and the keyboard device, for example, based on the keyboard use case, e.g., as described below.

In some demonstrative aspects, controller 124 and/or BT controller 169 may be configured to cause, trigger, instruct and/or control BT device 102 to configure a first BW allocation for the BT link, for example, based on a first keyboard use case, e.g., as described below.

In some demonstrative aspects, controller 124 and/or BT controller 169 may be configured to cause, trigger, instruct and/or control BT device 102 to configure a second BW allocation for the BT link, for example, based on an identified change from the first keyboard use case to a second keyboard use case, e.g., as described below.

In some demonstrative aspects, controller 124 and/or BT controller 169 may be configured to cause, trigger, instruct and/or control BT device 102 to determine an identified keyboard use case from a plurality of predefined keyboard use cases, for example, based on the transmissions from the keyboard device to BT device 102 over the BT link, e.g., as described below.

In some demonstrative aspects, controller 124 and/or BT controller 169 may be configured to cause, trigger, instruct and/or control BT device 102 to configure the BW allocation for the BT link, for example, based on a predefined BW allocation corresponding to the identified keyboard use case, e.g., as described below.

In some demonstrative aspects, the plurality of predefined keyboard use cases may include a plurality of predefined typing use cases configured to correspond to a respective plurality of typing speeds, e.g., as described below.

In some demonstrative aspects, a first typing use case may be configured to correspond to a first typing speed, and/or a second typing use case may be configured to correspond to a second typing speed, for example, different from the first typing speed, e.g., as described below.

In some demonstrative aspects, a first predefined BW allocation may be configured to correspond to the first typing use case, and/or a first predefined BW allocation may be configured to correspond to the first typing use case a second predefined BW allocation, e.g., different from the first predefined BW allocation, may be configured to correspond to the second typing use case, e.g., as described below.

In some demonstrative aspects, the first typing speed may be quicker than the second typing speed, and the second predefined BW allocation may be configured to support a wider BW than the first predefined BW allocation, e.g., as described below.

In other aspects, any other additional or alternative predefined typing use cases and/or predefined BW allocations may be defined.

In some demonstrative aspects, controller 124 and/or BT controller 169 may be configured to cause, trigger, instruct and/or control BT device 102 to identify a type of one or more keys pressed on the keyboard device, for example, based on the transmissions from the keyboard device, e.g., as described below.

In some demonstrative aspects, controller 124 and/or BT controller 169 may be configured to cause, trigger, instruct and/or control BT device 102 to identify the keyboard use case, for example, based on the type of keys pressed on the keyboard device, e.g., as described below.

In some demonstrative aspects, controller 124 and/or BT controller 169 may be configured to cause, trigger, instruct and/or control BT device 102 to determine an application-based use case, for example, based on an application to utilize an input based on the keypresses on the keyboard device, e.g., as described below.

In some demonstrative aspects, controller 124 and/or BT controller 169 may be configured to cause, trigger, instruct and/or control BT device 102 to configure the BW allocation for the BT link, for example, based on the application-based use case, e.g., as described below.

In some demonstrative aspects, controller 124 and/or BT controller 169 may be configured to cause, trigger, instruct and/or control BT device 102 to configure the BW allocation for the BT link to include a low-latency BW allocation, for example, based on a determination that the application-based use case includes a gaming use case, e.g., as described below.

In some demonstrative aspects, controller 124 and/or BT controller 169 may be configured to cause, trigger, instruct and/or control BT device 102 to configure the BW allocation for the BT link to include a high-latency BW allocation, for example, based on a determination that the application-based use case includes a low keyboard-usage use case, e.g., as described below.

In some demonstrative aspects, controller 124 and/or BT controller 169 may be configured to cause, trigger, instruct and/or control BT device 102 to identify the low keyboard-usage use case, for example, based on identifying that the transmissions from the keyboard device represent pressing of scrolling keys on the keyboard device, e.g., as described below.

In some demonstrative aspects, controller 124 and/or BT controller 169 may be configured to cause, trigger, instruct and/or control BT device 102 to identify initiation of a control procedure including communication of control packets over the BT link, e.g., as described below.

In some demonstrative aspects, controller 124 and/or BT controller 169 may be configured to cause, trigger, instruct and/or control BT device 102 to configure the BW allocation for the BT link according to requirements of the control procedure, e.g., as described below.

In some demonstrative aspects, controller 124 and/or BT controller 169 may be configured to detect BT device 140 and identify that BT device 140 is a keyboard device, e.g., as described below.

In some demonstrative aspects, controller 124 and/or BT controller 169 may be configured to detect that BT device 140 is a keyboard device, for example, by parsing Advertisement (ADV) data of a keyboard device, e.g., BT device 140, and looking at appearance values. For example, a mapping to the keyboard device may be defined in accordance with the Bluetooth Specification.

In some demonstrative aspects, a keyboard device, e.g., BT device 140, may broadcast the ADV data in connectable advertisement packets, for example, when the keyboard device is powered on and is ready to accept a connection from a controller device, e.g., BT device 102, e.g., a laptop or any other device.

In some demonstrative aspects, parsing of the ADV data may be configured as a host stack activity, e.g., in accordance with a BT Specification.

In some demonstrative aspects, controller 124 and/or BT controller 169 may be configured to parse the ADV data, for example, in order to deduce a peripheral type of a peripheral device, e.g., to identify the keyboard device.

In some demonstrative aspects, controller 124 and/or BT controller 169 may be configured to detect that BT device 140 is a keyboard device, for example, based on "Read by Type" packets, e.g., of an ATT layer, which may be communicated with the BT device 140. For example, the "Read by Type" packets may be exchanged between BT device 102 and BT device 140, for example, during a pairing procedure, and may be cached by a controller of the BT link, e.g., BT device 102.

In some demonstrative aspects, controller 124 and/or BT controller 169 may be configured to parse the ATT layer's "Read by Type" packets, and to store an "attribute handle" for keyboard reports. In one example, the parsing of the ATT layer may be performed as part of a host stack. In another example, the parsing of the ATT layer may be offloaded to the BT controller 169 of BT device 102.

In some demonstrative aspects, parsing of the "Read by Type" packets may be configured as a host stack activity, e.g., in accordance with a BT Specification.

In some demonstrative aspects, controller 124 and/or BT controller 169 may be configured to parse the "Read by Type" packets, for example, in order to deduce a peripheral type of a peripheral device, e.g., to identify the keyboard device.

In some demonstrative aspects, controller 124 and/or BT controller 169 may be configured to detect that BT device 140 is a keyboard device, for example, based on host-stack information from a host of BT device 102. A host stack, e.g., of an OS of BT device 102, may provide to controller 124 and/or BT controller 169 information identifying BT device 140 as the keyboard device.

For example, the host stack may update "additional link information" provided to the controller 124 and/or BT controller 169, for example, to indicate that the BT device is a keyboard device. In one example, the updated "additional link information" may be provided by a vendor command, and/or via any suitable out of band interface with the host-stack.

In some demonstrative aspects, controller 124 and/or BT controller 169 may be configured to detect a keyboard use case, for example, based on a determination that BT device 140 is to be identified as the keyboard device, e.g., as described below.

In some demonstrative aspects, controller 124 and/or BT controller 169 may be configured to identify the keyboard use case, for example, according to one or more use case categories, e.g., as described below.

In some demonstrative aspects, the use case categories may be based on one or more common use cases of a typing speed of a user of the keyboard.

In some demonstrative aspects, the typing speed of the user of the keyboard may be determined, for example, based on frequency/rate at which HID reports are generated by the keyboard device, e.g., as described below. In other aspects, the typing speed of the user of the keyboard may be identified based on any other additional or alternative techniques.

In some demonstrative aspects, a first use case category may include a "data entry" (typing) use case category, e.g., as described below.

For example, the data entry category may include a plurality of data entry use cases, where the user is consciously typing on the keyboard device. For example, one or more scenarios of the data entry use cases may include writing an email, creating and/or editing a document, creating and/or editing a report, and/or any other similar activity.

In some demonstrative aspects, the data entry use cases may include a plurality of sub-categories, e.g., three sub-categories or any other count of sub-categories, for example, based on a typing proficiency of the user.

In one example, three typing use cases may be defined, e.g., as described below.

For example, a Power/Professional typist use case may correspond to a typing speed of a professional typist. For example, according to this use case, keyboard data may arrive at a speed higher than about 40 words per minute, or any other predefined typing speed, which may be defined to represent the typing speed of a professional typist.

For example, a normal user typist use case may correspond to a typing speed of a "normal" typist, which is not an "expert" typist, but is sufficiently familiar with typing activities. For example, according to this use case, keyboard data may arrive at a speed of between about 10-40 words per minute, or any other predefined typing speed, which may be defined to represent the typing speed of a normal typist.

For example, a novice user typist use case may correspond to a typing speed of a "novice" typist, which is not sufficiently familiar with typing activities. For example, according to this use case, keyboard data may arrive at a speed of less than about 10 words per minute, or any other predefined typing speed, which may be defined to represent the typing speed of a novice typist.

In some demonstrative aspects, a second use case category may include a "special" use case category, which may include "non-standard" use cases, e.g., as described below.

For example, a gaming use case may correspond to a use case where the user is using the keyboard to provide input for a gaming application. For example, the gaming use case may have a relatively strict and/or relatively very low latency requirement.

For example, a content consumption use case may correspond to a use case where the user is using the keyboard to consume data, for example, while reading an e-mail or news, browsing the internet, or performing any other similar activity, where the keyboard usage is relatively low. In one example, during these scenarios, the user may mostly use the navigation keys. For example, the content consumption use case may be identified based a determination that the user is mainly using the "arrow keys" and/or the "scrolling keys", e.g., "PageUp" and/or "PageDown" keys. For example, it may be possible to use a relatively low BW allocation for the BT link with the keyboard, while still being able to support the content consumption use case, e.g., as described below.

For example, an online-meeting use case may correspond to a use case where the user is participating in an activity, where the keyboard usage is very low. For example, during this scenario the user may rarely use the keyboard, and may mostly use another peripheral device, e.g., a headset. For example, it may be possible to use a very low BW allocation for the BT link with the keyboard, while still being able to support the online-meeting use case, e.g., as described below.

For example, a control procedure update use case may correspond to a use case where a control procedure is active between the controller device and the keyboard device, e.g., at a link layer. For example, the control procedure may include a channel map update procedure, a power control update procedure, and/or any other additional or alternative control procedure.

In some demonstrative aspects, controller 124 and/or BT controller 169 may be configured to identify one or more special cases, which may include one-time frequent polling, e.g., as described below.

For example, a control packet use case may include a case when a control packet transaction is started, for example, by transmission of a control packet by a controller device, e.g., a laptop, or by the slave device, e.g., the keyboard device. For example, the control packet use case may include eliciting a response to the control packet in a short time, e.g., in an immediately following anchor point. For example, the controller device may poll the slave device, e.g., the keyboard device, in every connection interval, for example, until a response to the control packet is received, and/or the control packet transaction is completed.

For example, controller 124 and/or BT controller 169 may configure the BW allocation for the BT link with BT device 140, for example, to support the polling of the slave device, e.g., in each connection interval.

For example, controller 124 and/or BT controller 169 may reconfigure the BW allocation for the BT link with BT device 140, for example, after the control packet transaction is completed. For example, controller 124 and/or BT controller 169 may reconfigure the BW allocation for the BT link with BT device 140, for example, by switching back to a previous keyboard use case, e.g., a typing use case, for example, after the control packet transaction is completed.

In some demonstrative aspects, controller 124 and/or BT controller 169 may be configured to identify an unknown/unmapped use case, for example, where a keyboard use case detection algorithm cannot map the link type to any of the known and/or predefined use cases. In one example, the unknown/unmapped use case may be identified, for example, in response to a long press of a key on the keyboard.

In some demonstrative aspects, BT device 102 may be configured to identify the keyboard use case, for example, based on transmissions from the keyboard device, for example, the keyboard device implemented by BT device 140, e.g., as described below.

In some demonstrative aspects, BT device 102 may be configured to detect change(s) in an identified keyboard use case, e.g., as described below.

In some demonstrative aspects, BT device 102 may be configured to adjust an "effective connection interval" of the BT link, for example, according to the identified keyboard use case and/or a detected change in the identified keyboard use case, e.g., as described below.

In one example, controller 124 and/or BT controller 169 may be configured to detect that the user of the keyboard is a moderate typist. For example, the moderate typist may have an average typing speed of about 30 words per minute. This typing speed may yield, for example, 150 characters per minute on average, e.g., with an average of 5 letters per word. For example, a key press, e.g., every key press, may generate two HID reports, e.g., one HID report at the time of pressing the key, and a second HID report at the time of releasing the key. According to this example, it is expected that the keyboard device is to generate about 300 HID reports in one minute, e.g., for the moderate typist use case.

In some demonstrative aspects, controller 124 and/or BT controller 169 may be configured to set and/or adjust a polling interval of the BT link with the keyboard device, for example, based on the detected keyboard use case, e.g., as described below.

In some demonstrative aspects, controller 124 and/or BT controller 169 may be configured to determine the BW allocation for the BT link with the keyboard device, for example, while taking into account an accumulated drift of the BT link, for example, to avoid link lost. For example, the accumulated drift, which may be higher, may be kept in mind while determining the effective polling interval, for example, to avoid link loss, e.g., as described below.

For example, controller 124 and/or BT controller 169 may be configured to determine the BW allocation for the BT link with the keyboard device, for example, by setting, e.g., increasing or decreasing, the polling intervals for the BT link based on the keyboard use case, e.g., as described above. For example, for some keyboard use cases, e.g., a slow typing keyboard use case, the polling interval may be increased. For example, the polling interval may be initially set per a default polling interval, e.g., 22.5 ms, and increased, e.g., x2 the default polling interval, based on the detection of the slow typing keyboard use case slow typing keyboard use case. For example, the polling interval may be increased further, e.g., x4, the default polling interval, for example, based on the detection that the typing speed is slower. For example, the polling interval may be increased further, e.g., x8 the default polling interval, and so on.

For example, too much of an increase of the polling interval may eventually result in link-loss, e.g., due to accumulated drift. Accordingly, an upper limit may be set for the polling interval.

For example, the upper limit for the polling interval may be based on one or more attributes of the keyboard device.

In one example, the upper limit for the polling interval may be set to about 500 ms, which is about 45 times the default polling interval of 22.5 ms.

In another example, the upper limit for the polling interval may be set to about 400 ms, e.g., which may be suitable for some keyboard types. In other implementations, any other suitable upper limit for the polling interval may be set.

In some demonstrative aspects, controller 124 and/or controller 169 may be configured to detect HID reports from the keyboard device, e.g., of BT device 140, as described below.

In some demonstrative aspects, controller 124 and/or controller 169 may be configured to identify a keypress attribute, for example, based on the HID reports, e.g., as described below.

In some demonstrative aspects, controller 124 and/or controller 169 may be configured to identify a keyboard use case for the keyboard device, for example, based on the keypress attribute, e.g., as described below.

In some demonstrative aspects, controller 124 and/or controller 169 may be configured to parse attribute layer packets communicated with the keyboard device.

In some demonstrative aspects, controller 124 and/or controller 169 may be configured to detect and distinguish HID report packets, for example, from other packets from the host, e.g., host's control packets, battery level indicators, and/or any other additional or alternative host packets.

In some demonstrative aspects, controller 124 and/or controller 169 may be configured to identify the keypress attribute, for example, based on a timing of the HID reports, e.g., as described below.

In some demonstrative aspects, controller 124 and/or controller 169 may be configured to determine a time delta between a key-press packet and a key-release packet, e.g., immediately subsequent to the key-press packet. For example, the keyboard device implemented by BT device 140 may send a key release HID report, for example, approximately 100 ms after a key press event. For example, the time delta between the key-press packet and the key-release packet may be generally constant for the keyboard device. Accordingly, the time delta between the key-press packet and the key-release packet may be measured, e.g., and averaged. For example, the time delta between key-press packet and key-release packet may be about 4-5 connection intervals. For example, the key-press packet and the key-release packet may be considered as a single HID report.

In some demonstrative aspects, controller 124 and/or controller 169 may be configured to determine a time delta between two consecutive key presses. For example, the time delta between two consecutive key presses may be based on an average typing speed of the user of the keyboard.

For example, controller 124 and/or controller 169 may be configured to calculate the average typing speed over a time window, e.g., a minute or any other time window, for example, as the frequency of the key presses may not be constant. For example, this average typing speed may be used to determine the keyboard use case, e.g., as described below.

In one example, the typing speed of the user may be 10 words per minute, yielding 900 ms per keystroke, with an average of 5 letters per word. For example, an HID host controller, e.g., controller 124 and/or controller 169, may adjust its polling interval, for example, according to a sequence of connection intervals, which may be based on the typing speed. For example, the HID host controller may adjust its polling interval including an interleaved sequence of two different connection intervals, e.g., 100 ms, 800 ms, 100 ms, 800 ms, etc. For example, the first interval of 100 ms may be based on an average gap between key press and key release HID reports. For example, the second interval of 800 ms may include the delta time between the two key presses. For example, the HID host, e.g., controller 124 and/or controller 169, may service the HID link according to an interleaved sequence of first and second intervals, which may be based on integer multiples of a 22.5 ms connection interval. For example, the HID host, e.g., controller 124 and/or controller 169, may service the HID link every 5 22.5 ms connection intervals, e.g., corresponding to the 100 ms interval, followed by 35 22.5 ms connection intervals, e.g., corresponding to the 800 ms interval. This sequence of 5 22.5 ms connection intervals followed by 35 22.5 ms connection intervals may be repeated.

In another example, the typing speed of the user may be higher, e.g., 40 words per minute, e.g., yielding 150 ms per keystroke. For example, an HID host controller, e.g., controller 124 and/or controller 169, may adjust its polling interval, for example, according to a sequence of connection intervals, which may be based on the typing speed. For example, the HID host controller may adjust its polling interval including an interleaved sequence of two different connection intervals, e.g., 100 ms, 50 ms, 100 ms, 50 ms, etc. For example, this sequence may be represented by a substantially equivalent sequence of 75 ms connection intervals. Accordingly, the HID host may update its polling interval to 75 ms. For example, the HID host, e.g., controller 124 and/or controller 169, may service the HID link every 4 22.5 ms connection intervals, e.g., corresponding to the 75 ms interval.

In some demonstrative aspects, BT device 102 may be configured to detect a change in the keyboard use case, e.g., as described below.

In some demonstrative aspects, BT device 102 may be configured to detect a use case change corresponding to a scenario where the user moves from a lower typing speed to a higher typing speed, e.g., as described below.

In some demonstrative aspects, moving from the lower typing speed to the higher typing speed may result in more than one HID report to be sent in the anchor points that the keyboard device is being serviced. Accordingly, the keyboard device may indicate to the BT device 102 that it has more data to be sent. For example, the keyboard device may utilize a More Data (MD) bit in a transmitted packet header, e.g., by setting the MD bit to 1 to indicate that the keyboard device has more data to be sent. For example, controller 124 and/or controller 169 may be configured to identify there is a need to increase the polling interval of the keyboard device, for example, based on receipt of the packet from the keyboard device including the MD bit set to 1.

In some demonstrative aspects, BT device 102 may be configured to detect a use case change corresponding to a scenario where the user moves from a higher typing speed to a lower typing speed, e.g., as described below.

In some demonstrative aspects, BT device 102 may be configured to detect the move from the higher typing speed to the lower typing speed, for example, based on identifying a decrease in a hit rate, e.g., the number of times the keyboard device responds with an HID report. For example, the decrease in the hit rate may indicate that the keyboard device does not have enough HID reports to send every time the controller polls the keyboard device. This situation may indicate that the typing speed has decreased.

In some demonstrative aspects, a controller, e.g., controller 124 and/or controller 169, may be configured to allocate BW to a BT link for a keyboard device according to one or more of the following use cases:

TABLE 1

| Use case | Words per Minute | Characters per second | Polling rate | Duty cycle reduction achieved |
|---|---|---|---|---|
| Pro typist | 40 | 240 | 250 ms | 11× |
| Average typist | 25 | 150 | 400 ms | 17× |
| Novice typist | 10 | 60 | 1000 ms | 44× |
| Browsing or content consumption | Negligible | | | More than 50× |
| Special flows like Control procedure | | | | No impact on duty cycle |

For example, as shown in Table 1, the controller, e.g., controller 124 and/or controller 169, may be configured to set the polling rate for the BT link with the keyboard device, for example, based on an identified keyboard use case, e.g., as described above.

For example, as shown in Table 1, the controller, e.g., controller 124 and/or controller 169, may be configured to set the polling rate for the BT link with the keyboard device, for example, based on a typing speed of the user of the keyboard device, for example, for an identified typing keyboard use case, e.g., as described above.

For example, as shown in Table 1, a duty cycle reduction with a factor of about eleven times may be achieved with respect to a professional-typist use case, e.g., compared to a default 22.5 ms duty cycle.

For example, as shown in Table 1, a duty cycle reduction with a factor of about 17 times may be achieved with respect to an average-typist use case, e.g., compared to a default 22.5 ms duty cycle.

For example, as shown in Table 1, a duty cycle reduction with a factor of about 44 times may be achieved with respect to a novice-typist use case, e.g., compared to a default 22.5 ms duty cycle.

For example, as shown in Table 1, a duty cycle reduction with a factor of more than 50 times may be achieved with respect to a non-typing, e.g., a content-consumption, use case, e.g., compared to a default 22.5 ms duty cycle.

Figure 2:
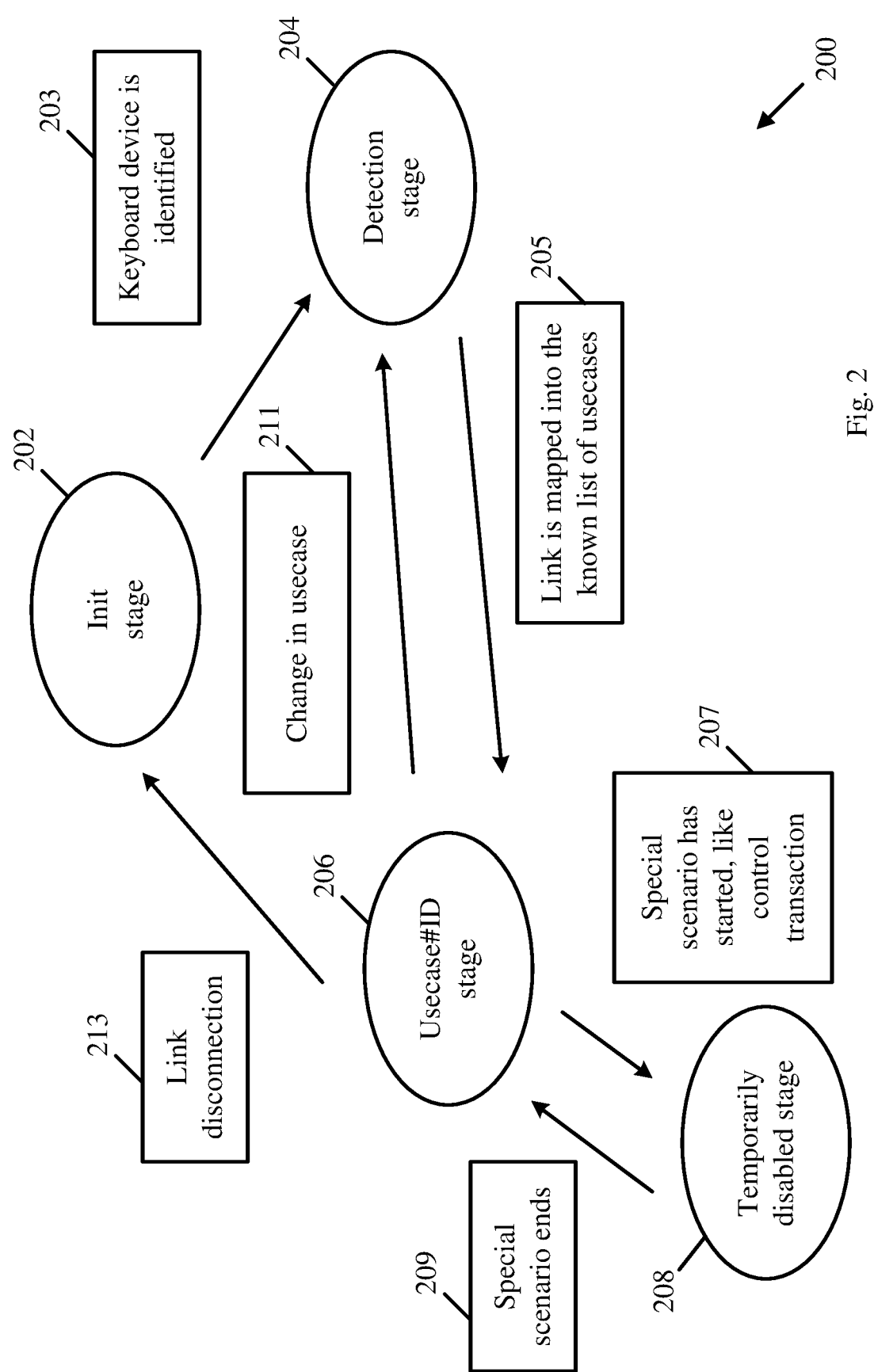
FIG. 2 is a schematic flow-chart illustration of a use case detection scheme, in accordance with some demonstrative aspects.

Reference is made to FIG. 2, which schematically illustrates a use case detection scheme 200, in accordance with some demonstrative aspects.

In some demonstrative aspects, a BT device, e.g., BT device 102 (FIG. 1) and/or BT device 140 (FIG. 1), may perform one or more operations of the use case detection scheme 200, for example, to detect a use case of a keyboard device, e.g., as described below.

In some demonstrative aspects, controller 124 (FIG. 1) and/or controller 169 (FIG. 1) may be configured to implement one or more operations of the use case detection scheme 200, for example, to detect a use case of a keyboard implemented by BT device 140 (FIG. 1).

In some demonstrative aspects, controller 124 (FIG. 1) and/or controller 169 (FIG. 1) may be configured to configure a BW allocation for a BT link between BT device 102 (FIG. 1) and BT device 140 (FIG. 1), for example, based on the detected use case of the keyboard implemented by BT device 140 (FIG. 1), e.g., as described above.

In some demonstrative aspects, as indicated at block 202, the use case detection scheme 200 may include an initialization stage, e.g., to initialize the use case detection.

In some demonstrative aspects, as indicated at block 203, the use case detection scheme 200 may include a keyboard detection stage. For example, BT device 102 (FIG. 1) may identify BT device 140 (FIG. 1) as a keyboard device, e.g., as described above.

In some demonstrative aspects, as indicated at block 204, the use case detection scheme 200 may include identifying a keyboard use case, for example, based on a determination that detected device is identified as a keyboard device. For example, BT device 102 (FIG. 1) may identify a keyboard use case from a plurality of keyboard use cases, for example, after identifying BT device 140 (FIG. 1) as the keyboard device, e.g., as described above. For example, BT device 102 (FIG. 1) may identify the keyboard use case based on transmissions from BT device 140 (FIG. 1) to BT device 102 (FIG. 1) over the BT link, e.g., as described above.

In some demonstrative aspects, as indicated at block 205, the use case detection scheme 200 may include mapping the BT link into an identified keyboard use case from the plurality of keyboard use cases. For example, BT device 102 (FIG. 1) may map the BT link into an identified keyboard use case from the plurality of keyboard use cases, e.g., as described above.

In some demonstrative aspects, as indicated at block 206, the use case detection scheme 200 may include configuring a BW allocation for the BT link based on the identified keyboard use case. For example, BT device 102 (FIG. 1) may configure a BW allocation for the BT link based on the identified keyboard use case, e.g., as described above.

In some demonstrative aspects, as indicated at block 207, the use case detection scheme 200 may include identifying a special use case scenario. For example, BT device 102 (FIG. 1) may identify initiation of a special procedure, e.g., a control procedure, including communication of control packets over the BT link, e.g., as described above. For example, BT device 102 (FIG. 1) may configure the BW allocation for the BT link according to requirements of the control procedure, e.g., as described above.

In some demonstrative aspects, as indicated at block 208, the use case detection scheme 200 may include temporarily disabling the BW allocation based on the keyboard use case, for example, based on the identification of the special use case scenario. For example, BT device 102 (FIG. 1) may switch configurations of the BT link according to requirements of the control procedure, for example, during the control procedure, e.g., as described above.

In some demonstrative aspects, as indicated at block 209, the use case detection scheme 200 may include activating the BW allocation based on the keyboard use case, for example, based on the identification that the special use case scenario has ended. For example, BT device 102 (FIG. 1) may switch back to configuring the BT link according to the identified keyboard use case, for example, after detecting an end of the control procedure, e.g., as described above.

In some demonstrative aspects, as indicated at block 211, the use case detection scheme 200 may include switching back to perform detection of the keyboard use case, for example, based on a determination that a change in the use case is detected. For example, BT device 102 (FIG. 1) may identify a change from a first keyboard use case to a second keyboard use case, e.g., as described above. For example, BT device 102 (FIG. 1) may configure another BW allocation for the BT link, for example, based on the identified change from the first keyboard use case to the second keyboard use case, e.g., as described above.

In some demonstrative aspects, as indicated at block 213, the use case detection scheme 200 may include switching back to the initial stage, for example, based on disconnection of the BT link. For example, BT device 102 (FIG. 1) may back to the initial stage 202, for example, after disconnection of the BT link.

Figure 3:
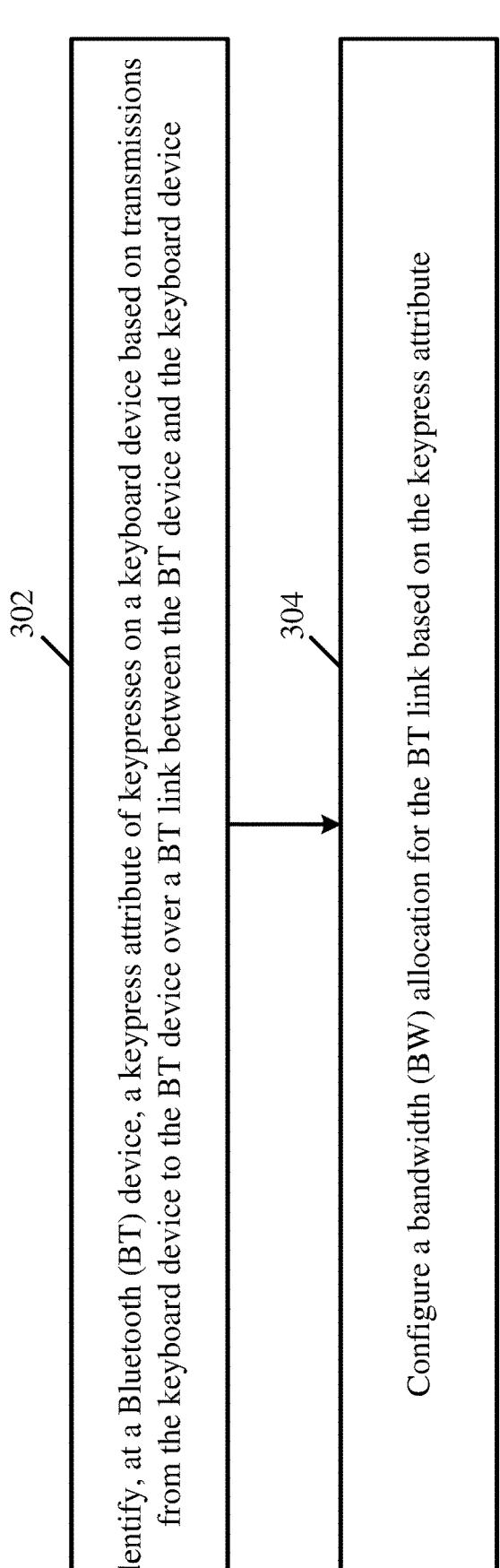
FIG. 3 is a schematic flow-chart illustration of a method of configuring a Bluetooth link for communication with a Human Interface Device (HID), in accordance with some demonstrative aspects.

Reference is made to FIG. 3, which schematically illustrates a method of configuring a BT link for communication with an HID, in accordance with some demonstrative aspects. For example, one or more of the operations of the method of FIG. 3 may be performed by one or more elements of a system, e.g., system 100 (FIG. 1), for example, a BT device, e.g., BT device 102 (FIG. 1), and/or a controller, e.g., controller 124 (FIG. 1) and/or BT controller 169 (FIG. 1).

As indicated at block 302, the method may include identifying at a BT device a keypress attribute of keypresses on a keyboard device based, for example, on transmissions from the keyboard device to the BT device over a BT link between the BT device and the keyboard device. For example, controller 124 (FIG. 1) may be configured to identify a keypress attribute of keypresses on a keyboard device implemented by BT device 140 (FIG. 1), for example, on transmissions from BT device 140 (FIG. 1) to BT device 102 (FIG. 1) over a BT link between BT device 102 (FIG. 1) and BT device 140 (FIG. 1), e.g., as described above.

As indicated at block 304, the method may include configuring a BW allocation for the BT link based on the keypress attribute. For example, controller 124 (FIG. 1) may be configured to configure a BW allocation for the BT link based on the keypress attribute, e.g., as described above.

Figure 4:
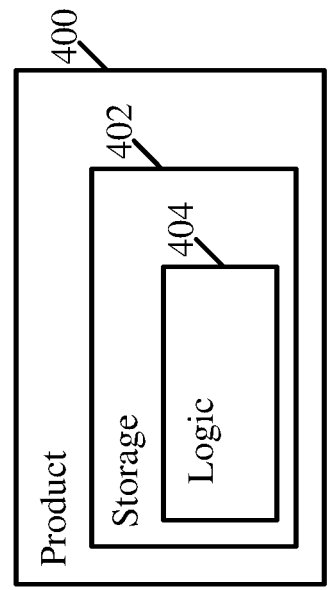
FIG. 4 is a schematic illustration of a product of manufacture, in accordance with some demonstrative aspects.

Reference is made to FIG. 4, which schematically illustrates a product of manufacture 400, in accordance with some demonstrative aspects. Product 400 may include one or more tangible computer-readable ("machine-readable") non-transitory storage media 402, which may include computer-executable instructions, e.g., implemented by logic 404, operable to, when executed by at least one computer processor, enable the at least one computer processor to implement one or more operations at device 102 (FIG. 1), controller 124 (FIG. 1), BT controller 169 (FIG. 1), and/or message processor 128 (FIG. 1); to cause device 102 (FIG.

1), controller 124 (FIG. 1), BT controller 169 (FIG. 1), and/or message processor 128 (FIG. 1) to perform, trigger and/or implement one or more operations and/or functionalities; and/or to perform, trigger and/or implement one or more operations and/or functionalities described with reference to the FIGS. 1, 2, and/or 3, and/or one or more operations described herein. The phrases "non-transitory machine-readable medium" and "computer-readable non-transitory storage media" may be directed to include all computer-readable media, with the sole exception being a transitory propagating signal.

In some demonstrative aspects, product 400 and/or machine-readable storage media 402 may include one or more types of computer-readable storage media capable of storing data, including volatile memory, non-volatile memory, removable or non-removable memory, erasable or non-erasable memory, writeable or re-writeable memory, and the like. For example, machine-readable storage media 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and circuitry configured to cause a Bluetooth (BT) device to identify a keypress attribute of keypresses on a keyboard device based on transmissions from the keyboard device to the BT device over a BT link between the BT device and the keyboard device; and configure a bandwidth (BW) allocation for the BT link based on the keypress attribute.

Example 2 includes the subject matter of Example 1, and optionally, wherein the apparatus is configured to cause the BT device to identify a keyboard use case based on the transmissions from the keyboard device to the BT device over the BT link, and to configure the BW allocation for the BT link based on the keyboard use case.

Example 3 includes the subject matter of Example 2, and optionally, wherein the apparatus is configured to cause the BT device to configure a first BW allocation for the BT link based on a first keyboard use case, and to configure a second BW allocation for the BT link based on an identified change from the first keyboard use case to a second keyboard use case.

Example 4 includes the subject matter of Example 2 or 3, and optionally, wherein the apparatus is configured to cause the BT device to determine an identified keyboard use case from a plurality of predefined keyboard use cases based on the transmissions from the keyboard device to the BT device over the BT link, and to configure the BW allocation for the BT link based on a predefined BW allocation corresponding to the identified keyboard use case.

Example 5 includes the subject matter of Example 4, and optionally, wherein the plurality of predefined keyboard use cases comprises a plurality of predefined typing use cases corresponding to a respective plurality of typing speeds.

Example 6 includes the subject matter of any one of Examples 2-5, and optionally, wherein the apparatus is configured to cause the BT device to identify a type of one or more keys pressed on the keyboard device based on the transmissions from the keyboard device, and to identify the keyboard use case based on the type of keys pressed on the keyboard device.

Example 7 includes the subject matter of any one of Examples 1-6, and optionally, wherein the apparatus is configured to cause the BT device to determine an application-based use case based on an application to utilize an input based on the keypresses on the keyboard device, and to configure the BW allocation for the BT link based on the application-based use case.

Example 8 includes the subject matter of Example 7, and optionally, wherein the application-based use case comprises a gaming use case, wherein the BW allocation for the BT link comprises a low-latency BW allocation.

Example 9 includes the subject matter of Example 7, and optionally, wherein the application-based use case comprises a low keyboard-usage use case, wherein the BW allocation for the BT link comprises a high-latency BW allocation.

Example 10 includes the subject matter of Example 9, and optionally, wherein the apparatus is configured to cause the BT device to identify the low keyboard-usage use case based on identifying that the transmissions from the keyboard device represent pressing of scrolling keys on the keyboard device.

Example 11 includes the subject matter of any one of Examples 1-10, and optionally, wherein the apparatus is configured to cause the BT device to identify initiation of a control procedure comprising communication of control packets over the BT link, and to configure the BW allocation for the BT link according to requirements of the control procedure.

Example 12 includes the subject matter of any one of Examples 1-11, and optionally, wherein the apparatus is configured to cause the BT device to identify the keypress attribute based on a pattern of the transmissions from the keyboard device to the BT device over the BT link.

Example 13 includes the subject matter of any one of Examples 1-12, and optionally, wherein the apparatus is configured to cause the BT device to identify the keypress attribute based on a rate of the transmissions from the keyboard device to the BT device over the BT link.

Example 14 includes the subject matter of any one of Examples 1-13, and optionally, wherein the apparatus is configured to cause the BT device to identify the keypress attribute based on a content of a keyboard input represented by the transmissions from the keyboard device.

Example 15 includes the subject matter of any one of Examples 1-14, and optionally, wherein the transmissions from the keyboard device to the BT device over the BT link comprise Human Interface Device (HID) reports from the keyboard device.

Example 16 includes the subject matter of Example 15, and optionally, wherein the apparatus is configured to cause the BT device to identify the keypress attribute based on a time difference between two consecutive keypress HID reports.

Example 17 includes the subject matter of Example 15 or 16, and optionally, wherein the apparatus is configured to cause the BT device to identify the keypress attribute based on a time difference between a keypress HID report and a key release HID report subsequent to the keypress HID report.

Example 18 includes the subject matter of any one of Examples 1-17, and optionally, wherein the keypress attribute comprises a keypress rate corresponding to a rate of the keypresses on the keyboard device.

Example 19 includes the subject matter of any one of Examples 1-18, and optionally, wherein the BW allocation for the BT link comprises a setting of a sequence of connection intervals scheduled for the keyboard device over the BT link, wherein a time difference between consecutive connection intervals in the sequence of connection intervals scheduled for the keyboard device is based on the keypress attribute.

Example 20 includes the subject matter of Example 19, and optionally, wherein the time difference between two consecutive connection intervals in the sequence of connection intervals for the keyboard device is at least 75 milliseconds (msec).

Example 21 includes the subject matter of any one of Examples 1-20, and optionally, wherein the BW allocation for the BT link comprises a setting of a sequence of pairs of connection intervals scheduled for the keyboard device over the BT link, wherein a pair of connection intervals comprises a first connection interval scheduled for a keypress report followed by a second connection interval scheduled for a key release report.

Example 22 includes the subject matter of Example 21, and optionally, wherein a time difference between two consecutive pairs of connection intervals is based on the keypress attribute.

Example 23 includes the subject matter of any one of Examples 1-22, and optionally, wherein the BW allocation for the BT link comprises a setting of a polling rate.

Example 24 includes the subject matter of any one of Examples 1-23, and optionally, comprising a BT radio to communicate BT packets over the BT link.

Example 25 includes the subject matter of Example 24, and optionally, comprising one or more antennas connected to the BT radio, and a processor to execute instructions of an operating system of the BT device.

Example 26 comprises a wireless communication device comprising the apparatus of any one of Examples 1-25.

Example 27 comprises an apparatus comprising means for executing any of the described operations of Examples 1-25.

Example 28 comprises a product comprising one or more tangible computer-readable non-transitory storage media comprising computer-executable instructions operable to, when executed by at least one processor, enable the at least one processor to cause a device to perform any of the described operations of Examples 1-25.

Example 29 comprises an apparatus comprising: a memory interface; and processing circuitry configured to: perform any of the described operations of Examples 1-25.

Example 30 comprises a method comprising any of the described operations of Examples 1-25.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a Bluetooth (BT) device to:

identify a keypress attribute of keypresses on a keyboard device based on transmissions from the keyboard device to the BT device over a BT link between the BT device and the keyboard device, wherein the keypress attribute comprises a keypress rate corresponding to a rate of the keypresses on the keyboard device; and configure a bandwidth (BW) allocation for the BT link based on the keypress attribute.

2. The apparatus of claim 1 configured to cause the BT device to identify a keyboard use case based on the transmissions from the keyboard device to the BT device over the BT link, and to configure the BW allocation for the BT link based on the keyboard use case.

3. The apparatus of claim 2 configured to cause the BT device to configure a first BW allocation for the BT link based on a first keyboard use case, and to configure a second BW allocation for the BT link based on an identified change from the first keyboard use case to a second keyboard use case.

4. The apparatus of claim 2 configured to cause the BT device to determine an identified keyboard use case from a plurality of predefined keyboard use cases based on the transmissions from the keyboard device to the BT device over the BT link, and to configure the BW allocation for the BT link based on a predefined BW allocation corresponding to the identified keyboard use case.

5. The apparatus of claim 4, wherein the plurality of predefined keyboard use cases comprises a plurality of predefined typing use cases corresponding to a respective plurality of typing speeds.

6. The apparatus of claim 2 configured to cause the BT device to identify a type of one or more keys pressed on the keyboard device based on the transmissions from the keyboard device, and to identify the keyboard use case based on the type of keys pressed on the keyboard device.

7. The apparatus of claim 1 configured to cause the BT device to determine an application-based use case based on an application to utilize an input based on the keypresses on the keyboard device, and to configure the BW allocation for the BT link based on the application-based use case.

8. The apparatus of claim 7, wherein the application-based use case comprises a gaming use case, wherein the BW allocation for the BT link comprises a low-latency BW allocation.

9. The apparatus of claim 7, wherein the application-based use case comprises a low keyboard-usage use case, wherein the BW allocation for the BT link comprises a high-latency BW allocation.

10. The apparatus of claim 1 configured to cause the BT device to identify initiation of a control procedure comprising communication of control packets over the BT link, and to configure the BW allocation for the BT link according to requirements of the control procedure.

11. The apparatus of claim 1 configured to cause the BT device to identify the keypress attribute based on a pattern of the transmissions from the keyboard device to the BT device over the BT link.

12. The apparatus of claim 1 configured to cause the BT device to identify the keypress attribute based on a rate of the transmissions from the keyboard device to the BT device over the BT link.

13. The apparatus of claim 1 configured to cause the BT device to identify the keypress attribute based on a content of a keyboard input represented by the transmissions from the keyboard device.

14. The apparatus of claim 1, wherein the transmissions from the keyboard device to the BT device over the BT link comprise Human Interface Device (HID) reports from the keyboard device.

15. The apparatus of claim 14 configured to cause the BT device to identify the keypress attribute based on a time difference between two consecutive keypress HID reports.

16. The apparatus of claim 1 configured to cause the BT device to configure a first BW allocation for the BT link based on a first keypress rate, and to configure a second BW allocation for the BT link based on a second keypress rate different from the first keypress rate, the second BW allocation for the BT link different from the first BW allocation for the BT link.

17. The apparatus of claim 1, wherein the BW allocation for the BT link comprises a setting of a sequence of connection intervals scheduled for the keyboard device over the BT link, wherein a time difference between consecutive connection intervals in the sequence of connection intervals scheduled for the keyboard device is based on the keypress attribute.

18. The apparatus of claim 1, wherein the BW allocation for the BT link comprises a setting of a sequence of pairs of connection intervals scheduled for the keyboard device over the BT link, wherein a pair of connection intervals comprises a first connection interval scheduled for a keypress report followed by a second connection interval scheduled for a key release report.

19. The apparatus of claim 18, wherein a time difference between two consecutive pairs of connection intervals is based on the keypress attribute.

20. The apparatus of claim 1, wherein the BW allocation for the BT link comprises a setting of a polling rate.

21. The apparatus of claim 1 comprising a BT radio to communicate BT packets over the BT link, one or more antennas connected to the BT radio, and a processor to execute instructions of an operating system of the BT device.

22. One or more tangible computer-readable non-transitory storage media comprising instructions operable to, when executed by at least one processor, enable the at least one processor to cause a Bluetooth (BT) device to:

identify a keypress attribute of keypresses on a keyboard device based on transmissions from the keyboard device to the BT device over a BT link between the BT device and the keyboard device, wherein the keypress attribute comprises a keypress rate corresponding to a rate of the keypresses on the keyboard device; and configure a bandwidth (BW) allocation for the BT link based on the keypress attribute.

23. The one or more tangible computer-readable non-transitory storage media of claim 22, wherein the instructions, when executed, cause the BT device to identify a keyboard use case based on the transmissions from the keyboard device to the BT device over the BT link, and to configure the BW allocation for the BT link based on the keyboard use case.

24. An apparatus for a Bluetooth (BT) device, the apparatus comprising:

means for identifying a keypress attribute of keypresses on a keyboard device based on transmissions from the keyboard device to the BT device over a BT link between the BT device and the keyboard device, wherein the keypress attribute comprises a keypress rate corresponding to a rate of the keypresses on the keyboard device; and means for configuring a bandwidth (BW) allocation for the BT link based on the keypress attribute.

25. The apparatus of claim 24 comprising means for identifying the keypress attribute based on a pattern of the transmissions from the keyboard device to the BT device over the BT link.

* * * * *